United States Patent [19]

Sheehan

[11] Patent Number: 4,914,847

[45] Date of Patent: Apr. 10, 1990

[54] DEVICE FOR TESTING THE HOOKING EFFECTIVENESS OF A FISHING LURE

[76] Inventor: Larry A. Sheehan, 1002 Plaza Towers, Springfield, Mo. 65804

[21] Appl. No.: 390,240

[22] Filed: Aug. 4, 1989

[51] Int. Cl.$^4$ .............................................. A01K 97/00
[52] U.S. Cl. ......................................................... 43/4
[58] Field of Search ...................... 43/1, 4; 73/7, 9, 12, 73/865.3, 865.4, 865.9

[56] References Cited

U.S. PATENT DOCUMENTS 4,870,772 10/1989 Johns .......................................... 43/4

Primary Examiner—Kurt Rowan
Attorney, Agent, or Firm—Senniger, Powers, Leavitt and Roedel

[57] ABSTRACT

A device for testing the hooking effectiveness of a fishing lure, comprising a frame, a pair of jaws representative of the jaws of a fish mounted on the frame for movement of the jaws toward and away from a closed position, and a resilient mechanism urging the jaws toward their closed position. The arrangement is such that a fishing lure comprising a head and a trailing hook is adapted to be pulled, head first, through the jaws with the jaws moving away from their closed position as the head passes between the jaws and thereafter moving under the bias of the resilient mechanism back toward their closed position. The trailing hook is adapted either to hook one of the jaws indicating that the lure is generally effective for hooking fish or to pass between the jaws without hooking one of the jaws indicating that the lure is less effective for hooking fish.

9 Claims, 2 Drawing Sheets

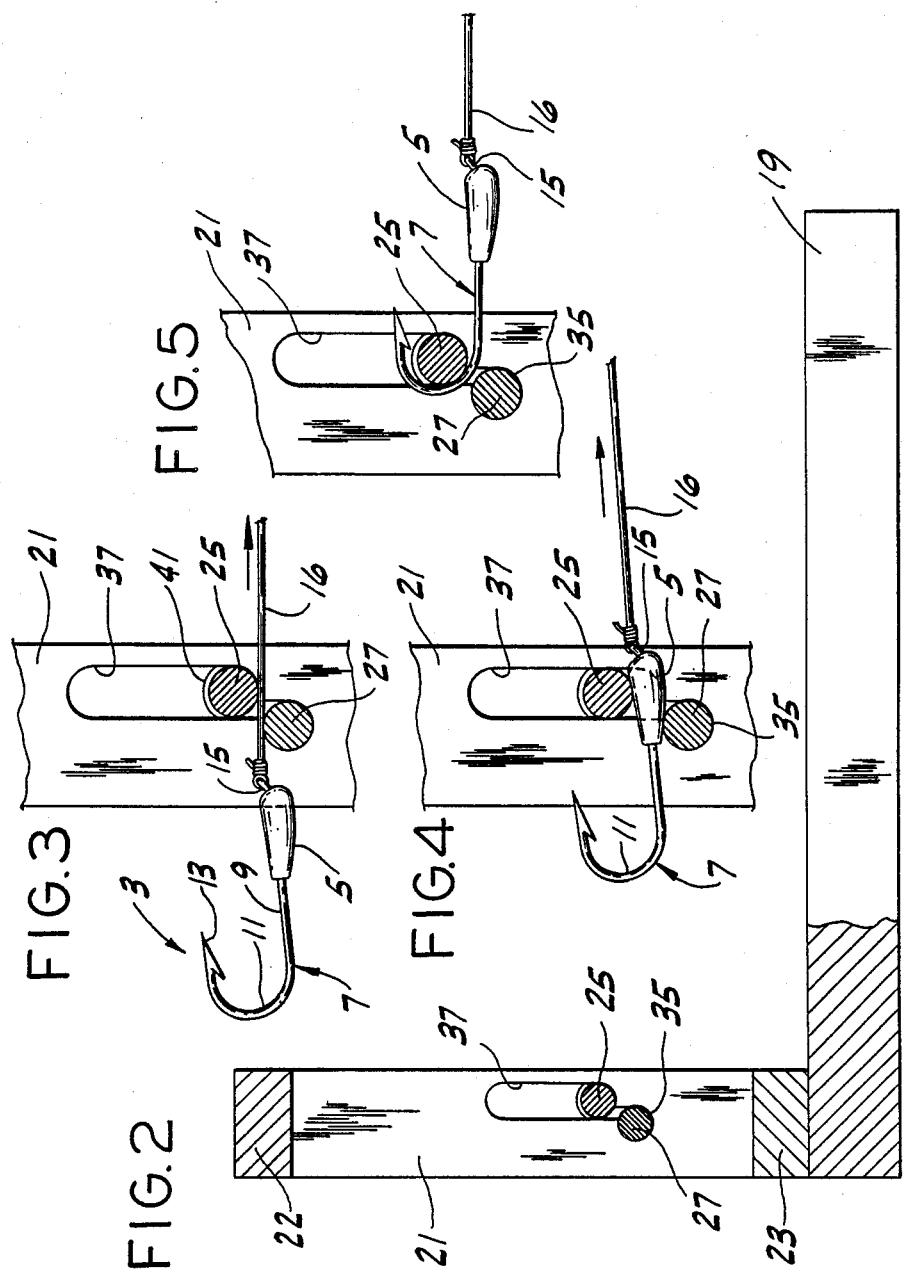

DEVICE FOR TESTING THE HOOKING EFFECTIVENESS OF A FISHING LURE

BACKGROUND OF THE INVENTION

This invention relates generally to fishing equipment and, more particularly, to a device for testing the hooking effectiveness of fishing lures.

One of the most important requirements of a fishing lure is the ability to consistently hook and retain fish. It will be noted in this regard that when a fish takes a lure into its mouth, a fisherman will typically attempt to set the hook by jerking or snapping the line. If the lure is properly designed, the hook should properly set (become embedded in the mouth of the fish) in most instances, thereby ensuring that very few fish escape once they have taken the bait. If the lure is less effective in its design, the hook may not properly set on a consistent basis, in which case many fish will escape even though they have taken the lure. Heretofore, it has been difficult if not impossible to readily test the hooking effectiveness of a particular lure except by using it in live situations. Of course, where the lure design is deficient, the results can be very frustrating to a fisherman.

There is a need, therefore, for a device which can be used to test the hooking effectiveness of a lure before the lure is used in the field.

SUMMARY OF THE INVENTION

Among the several objects of this invention may be noted the provision of a device for testing the hooking effectiveness of a fishing lure; the provision of such a device which is simple to use; the provision of such a device which enables the hooking effectiveness of a lure to be determined very quickly and with only a minimum of effort; and the provision of such a device which is of economical construction.

Briefly, a device of the present invention is adapted for testing the hooking effectiveness of a fishing lure. The device comprises a frame, a pair of jaws representative of the jaws of a fish mounted on the frame for movement of the jaws toward and away from a closed position, and spring means urging said jaws toward said closed position. The arrangement is such that a fishing lure comprising a head and a trailing hook is adapted to be pulled, head first, through the jaws with the jaws moving away from their closed position as the head passes between the jaws and thereafter moving under the bias of said spring means back toward their closed position. The trailing hook is adapted either to hook one of the jaws indicating that the lure is generally effective for hooking fish or to pass between the jaws without hooking one of the jaws indicating that the lure is less effective for hooking fish.

Other objects and features will be in part apparent and in part pointed out hereinafter.

BRIEF DESCRIPTION OF THE DRAWINGS

FIG. 2 is a vertical section taken in the plane of line 2—2 of FIG. 1; and

FIGS. 3-6 are views illustrating use of the device to test the hooking effectiveness of fishing lures.

Corresponding parts are designated by corresponding reference numerals and characters throughout the several views of the drawings.

DESCRIPTION OF THE PREFERRED EMBODIMENT

Figure 1:
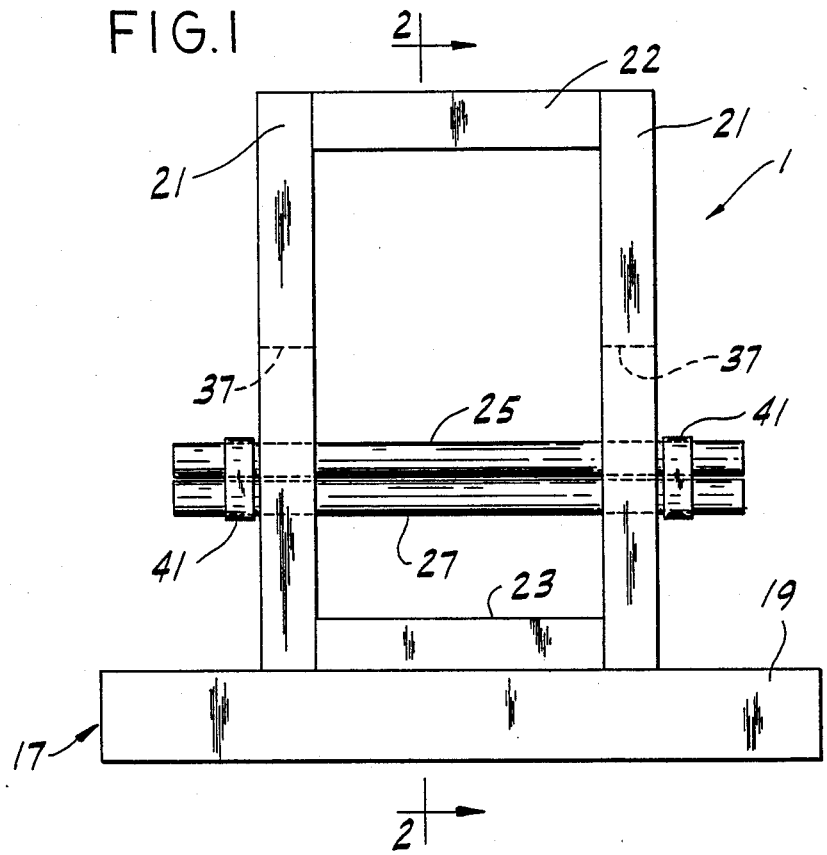
FIG. 1 is a front elevation of a lure testing device of the present invention.

Referring now to the drawings, and first more particularly to FIG. 1, there is generally indicated at 1 a device of the present invention for testing the hooking effectiveness of a lure. One such lure, generally designated 3, is depicted in FIGS. 3-5 as having a head 5 and a trailing hook 7. As illustrated, the hook is of conventional configuration, comprising a generally straight shank 9, a curved butt portion 11, and a pointed barb 13, all of which lie generally in the same plane. An eye 15 is provided at the front of the head of the lure for attachment of a fishing line 16.

More specifically, the device 1 comprises a frame generally indicated at 17 including flat base 19 and two upright frame members in the form of vertical posts, each designated 21. The posts are spaced apart and are connected at their upper and lower ends by horizontal braces designated 22 and 23, respectively. The device also includes a pair of jaws 25, 27 mounted on the posts for movement toward and away from a closed position (FIGS. 1 and 2) in which the jaws are close together. One of these jaws (the upper jaw 25 as shown in the drawings) is representative of the upper jaw of a fish and the other of these jaws (the lower jaw 27) is representative of the lower jaw of the fish.

As shown best in FIG. 1, each jaw 25, 27 comprises an elongate, generally straight jaw member extending horizontally between the posts 21 with the ends of the jaw member supported by the posts. Each jaw member 25, 27 is of generally circular cross section. It will be understood, however, that the jaws could take other shapes without departing from the scope of this invention. In the embodiment shown in the drawings, the ends of the lower jaw member 27 extend through circular openings 35 in the posts 21. The diameter of each opening 35 is only slightly greater than diameter of the lower jaw member so that the lower jaw member is held in a substantially fixed vertical position. The ends of the upper jaw member 25 extend through vertical slots 37 forming guideways in the posts 21 above the circular openings 35 for the lower jaw member 27. The width of each slot 37 is only slightly greater than the diameter of the upper jaw member 25 so that the upper jaw member is closely confined to movement along a vertical path toward and away from the lower jaw 27. The ends of each slot 37 have a radius generally equal to the radius of the upper jaw member 25, and the lower end of each slot forms a seat for the upper jaw member. The central vertical axis of each slot 37 is offset forwardly (to the right as viewed in FIG. 2) with respect to the central vertical axis of a respective lower jaw opening 35, so that the upper jaw member 25 protrudes forward beyond the lower jaw member 27 to simulate the protruding upper jaw of a fish. It will be understood that the upper jaw member 25 could be fixed and the lower jaw member 27 movable, or both jaw members movable, without departing from the scope of this invention.

Resilient means comprising a pair of rubber bands each indicated at 41 urges the jaws toward their closed position in which the upper jaw member 25 is seated against the bottoms of the slots 37. When the upper jaw member is in this position, the two jaw members are relatively close to one another (and may in fact touch one another), although their relative positions should not be such as to substantially inhibit the pulling of a fishing line 16 therebetween. In the embodiment shown in the drawings, for example, the horizontal plane tangent to the bottom of the lower jaw member 27 is spaced from the horizontal plane tangent to the top of the upper jaw member 25 a distance approximately equal to the diameter of a fishing line. The force urging the jaws members toward one another may be adjusted by varying the strength characteristics of the rubber bands 41, or by wrapping the bands differently around the jaw members, or in other ways. Of course, suitable resilient means other than rubber bands may be used for accomplishing the intended result.

It will be observed that the construction of the present invention readily permits removal of the jaw members 25, 27 from the frame for repair and/or replacement; the rubber bands 41 only need be removed and the jaw members slidably removed from their respective openings. The jaw members may be made of any suitable, sufficiently durable material (e.g., wood, plastic, metal).

Figure 6:
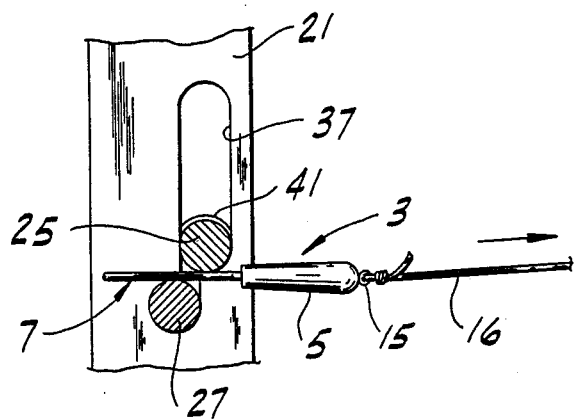

FIGS. 3-6 illustrate how the device 1 is used to test a lure 3 for hooking effectiveness. The fishing line 17 is inserted between the jaw members and pulled forwardly (to the right as viewed in FIG. 3). As the head 5 of the lure engages the jaw members 25, 27 the jaw members will first move away from one another to permit passage of the lure therebetween (see FIG. 4). Depending on the hooking effectiveness of the lure, the engagement of the head with the jaw members (which simulate the upper and lower jaws of a fish) will either cause the hook to assume a set position in which the plane of the hook is generally vertical (i.e., perpendicular to the roof and floor of the mouth of the fish) for proper setting of the hook in the mouth of the fish (FIG. 4), or will allow the hook to remain in a non-setting position, such as one in which the hook lies in a plane generally parallel to the floor and roof of the mouth of the fish. If the hook is in a proper hooking orientation, it will hook onto one of the upper and lower jaw members 25, 27, as shown in FIG. 5, thereby indicating that the lure will be generally effective in hooking fish. If, on the other hand, the lure is in a non-setting position, it is likely to pass completely between the jaw members without hooking onto either one, as shown in FIG. 6, thereby indicating that the lure will be less effective in hooking a fish.

In using the device 1, the fishing line should be pulled while standing to one side of the frame, so that any possible risk of injury may be avoided in the event the lure is snapped or jerked completely through the upper and lower jaw members 25, 27. Also, a suitable shield (not shown) may be mounted on the frame for added protection.

It will be observed from the foregoing that the device 1 of this invention enables one to readily evaluate and demonstrate the hooking effectiveness of any given lure. Moreover, the evaluation can be carried out quickly by a simple procedure. While a single pull of a lure through the jaws 25, 27 is generally indicative of the hooking effectiveness of the lure, a series of pull throughs may give a more reliable indication of the lure's hooking effectiveness.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A device for testing the hooking effectiveness of a fishing lure, comprising
   a frame,
   a pair of jaws representative of the jaws of a fish mounted on the frame for movement of the jaws toward and away from a closed position, and
   resilient means urging said jaws toward said closed position, the arrangement being such that a fishing lure comprising a head and a trailing hook is adapted to be pulled, head first, through the jaws with the jaws moving away from said closed position as the head passes between the jaws and thereafter moving under the bias of said resilient means back toward said closed position, said trailing hook being adapted either to hook one of said jaws indicating that the lure is generally effective for hooking fish or to pass between the jaws without hooking one of the jaws indicating that the lure is less effective for hooking fish.

2. A device as set forth in claim 1 wherein said pair of jaws comprises a first jaw, representative of the upper jaw of a fish, and a second jaw, representative of the lower jaw of a fish, said first jaw protruding outwardly beyond the second jaw when the jaws are in said closed position.

3. A device as set forth in claim 1 wherein said frame comprises a base and a pair of upright spaced-apart frame members on the base, said jaws being mounted on said upright frame members.

4. A device as set forth in claim 3 wherein said jaws comprise a pair of elongate generally parallel jaw members having ends supported by said upright frame members.

5. A device as set forth in claim 4 wherein one jaw is mounted in fixed position on the frame and the other jaw is movable relative to said one jaw.

6. A device as set forth in claim 5 wherein the upright frame members have generally vertical slots therein forming gudeways for the ends of said movable jaw.

7. A device as set forth in claim 4 wherein each jaw member is generally straight and generally circular in transverse cross section.

8. A device as set forth in claim 1 wherein the jaws are removable from the frame for repair and/or replacement.

9. A device as set forth in claim 1 wherein said resilient means is adjustable for varying the force urging the jaws closed.

* * * * *